W. L. McLEAN.
FRUIT AND VEGETABLE SLICER AND PEELER.
APPLICATION FILED JAN. 22, 1919.
1,304,079. Patented May 20, 1919.
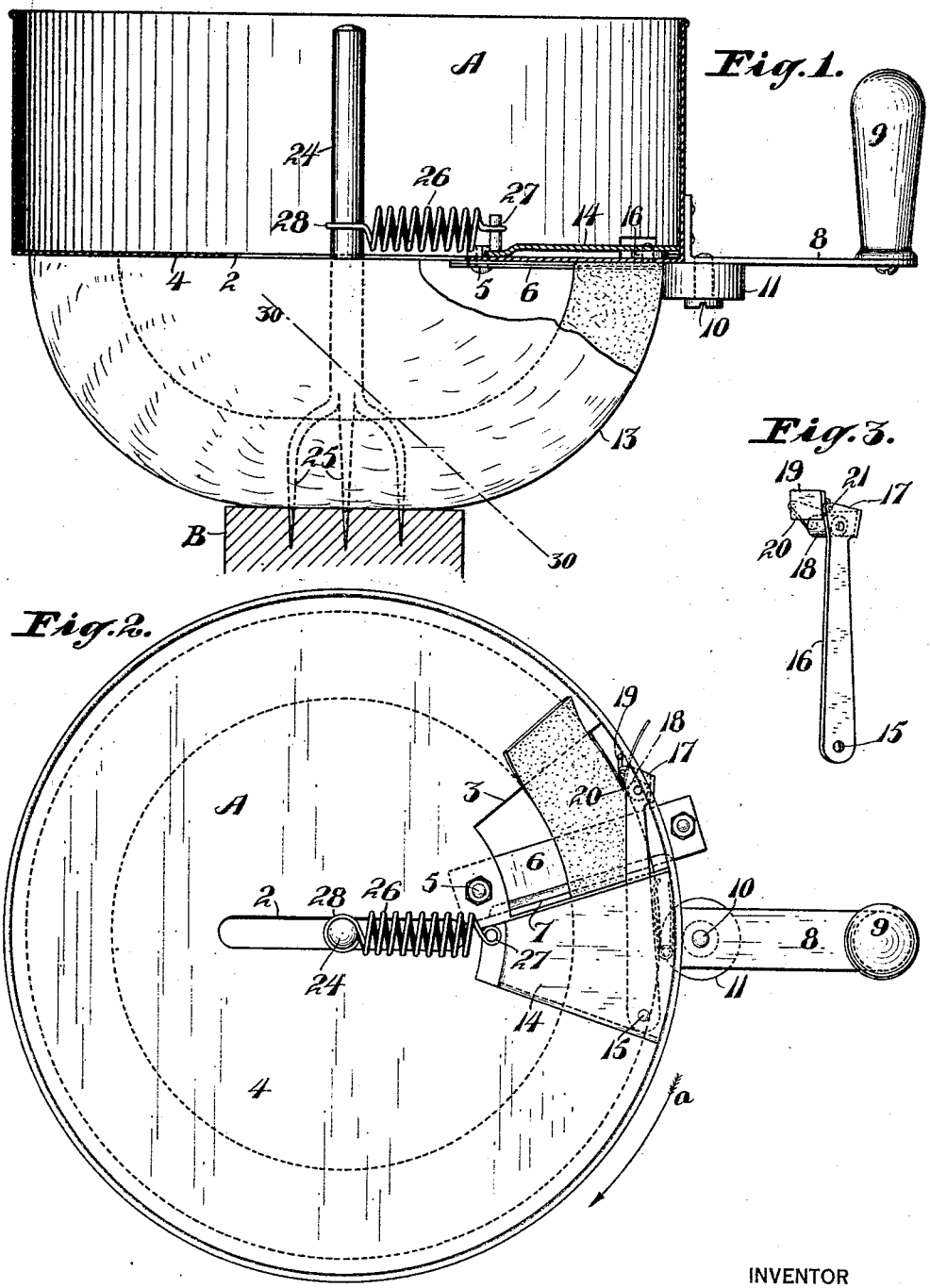
INVENTOR
Warren L. McLean
BY
Strong & Townsend
ATTORNEYS

UNITED STATES PATENT OFFICE.

WARREN L. McLEAN, OF SAN FRANCISCO, CALIFORNIA.

FRUIT AND VEGETABLE SLICER AND PEELER.

1,304,079. Specification of Letters Patent. Patented May 20, 1919.

Application filed January 22, 1919. Serial No. 272,576.

*To all whom it may concern:*

Be it known that I, WARREN L. McLEAN, a citizen of the United States, residing at the city and county of San Francisco and State of California, have invented new and useful Improvements in Fruit and Vegetable Slicers and Peelers, of which the following is a specification.

This invention relates to a vegetable slicer and peeler.

One of the objects of the present invention is to provide a simple, easily operated device of the character described which is particularly adapted for slicing and peeling vegetables and fruits, such as pumpkins and the like. Another object of the invention is to provide a slicer which permits the formation of a continuous spiral-shaped slice, and, furthermore, a peeling knife which removes the peeling as the slice is being made and which is so yieldingly mounted that it may follow any depressions or irregular surface formations presented, thus reducing the waste or the thickness of the peeling removed to a minimum. Further objects will hereinafter appear.

The invention consists of the parts and the construction, combination and arrangement of parts as hereinafter more fully described and claimed, having reference to the accompanying drawings, in which—

Figure 1 is a central, vertical section through the slicing and peeling machine.

Fig. 2 is a plan view of the same.

Fig. 3 is a detail perspective view of the peeling knife.

Referring to the drawings in detail, A indicates a pan-shaped receiver, in the bottom portion of which is formed a radially disposed slot 2 and a peripheral slot or opening 3. Suitably secured to the bottom 4 of the receiver, as at 5, just below the peripheral opening 3, is a slicing knife 6, the cutting edge of which is shown at 7. Secured to the outer edge of the pan is a bracket arm 8 which carries a handle 9, and journaled at the inner end of the bracket arm, as at 10, is a roller 11. This roller forms a guide which engages the outer surface or edge of the pumpkin generally shown at 13 when the slicing and peeling operation takes place, as will hereinafter be described.

Disposed interior of the pan and spaced with relation to the bottom portion is a shield plate 14. Pivotally mounted between the shield plate and the bottom of the pan, as at 15, is an arm 16, on the outer end of which is formed a pair of bearing lugs 17 between which is journaled a guide roller 18. Pivotally mounted between the lugs, just rearwardly of the roller 18, is a peeling knife 19. The cutting edge of the knife is shown at 20, while the pins by which it is pivotally supported are shown at 21. These pins are positioned closer to the cutting edge than to the rear edge, this positioning of the pins being resorted to to permit the pivotally mounted peeling blade to follow any depressions or irregular surface formations presented. The length of the arm 16 supporting the guide roller 18 and the peeling knife 19 is shown in Fig. 2, that is, the free end of the arm on which the bearing lugs are formed extends downwardly through the peripheral opening 3, thus permitting the peeling knife and roller 18 to engage the exterior surface of the pumpkin at a point rearwardly of the slicing knife, or where the peeling knife may engage the slice as it leaves the slicing knife.

In actual operation, when it is desired to peel and slice pumpkins or similar fruits and vegetables, it is first necessary to cut the pumpkin in half. The halves are then cleaned to remove the seeds and the pulp surrounding the same and each half is then taken and placed upon a suitable support, as the upper end of a post, shown at B. Each half is secured in position on top of the post by means of a rod 24. The lower end of this rod is provided with prongs 25 which pass through the pumpkin and enter the post. Each half of the pumpkin before the slicing and peeling operation takes place is thus rigidly secured to the post. The receiver A is then placed on top of the pumpkin, this being permitted as the rod 24 may pass through the slot 2.

A spring 26 secured at one end to a pin 27 is simultaneously attached to the rod 24, as at 28. The tension of this spring pulls the pan over toward the outer edge of the pumpkin, or, in other words, to a position where the roller 11 engages the same, the engagement of the roller with the pumpkin being maintained regardless of the position of the pan. The operator may now grasp the handle 9 and turn the pan or receiver in the direction of arrow *a*. The slicing knife 6 will thus engage the surface of the pumpkin and cut a slice the thickness of which is determined by the spacing between the knife and the bottom of the pan. The slice cut by said knife after leaving the same is immediately engaged by the peeling knife 19. This removes the peeling, and, as it is pivotally mounted and guided by means of the roller 18, it can readily be seen that the thickness of the peeling may be reduced to a minimum as the roller 18 determines the thickness, while the pivotal mounting of the peeling blade permits said blade to follow all irregular surfaces presented. The slice after leaving the peeling knife enters the pan through the opening 3, and, as the pan is continuously turned, by means of the handle 9 in the direction of arrow $a$, it can readily be seen that a continuous spiral-shaped slice is formed, this slice being received by the pan and supported thereby until the pumpkin has been completely sliced and peeled. It may then be removed and hung up for drying or otherwise treated.

The pan or receiver A assumes a horizontal position to begin with, but naturally assumes an angular position as the last part of the pumpkin is being sliced and peeled. In fact, it is possible to slice and peel everything except that which is gripped by the prongs 25 of the rod. The angle assumed by the pan while the last portion is being cut is indicated by the dotted line 30—30.

While a shallow pan-shaped receiver is here shown, I wish it understood that the depth and shape of the same may be increased or decreased to suit various conditions and requirements; similarly, that the materials and finish of the several parts employed may be such as the experience and judgment of the manufacturer may dictate.

Having thus described my invention, what I claim and desire to secure by Letters Patent is:

1. In a fruit and vegetable slicer and peeler, a supporting member, means for securing the fruit or vegetable to be sliced and peeled on said member, a receiver turnably mounted on said securing member above the fruit or vegetable, a slicing knife carried by the receiver and a peeling knife carried by the receiver.

2. In a fruit and vegetable slicer and peeler, a supporting member, means for securing the fruit or vegetable to be sliced and peeled on said member, a receiver turnably mounted on said securing member above the fruit or vegetable, means for turning the receiver about the securing member, a slicing knife secured to the receiver adapted to cut a continuous spiral-shaped slice during the rotation of the receiver, and a peeling knife carried by the receiver.

3. In a fruit and vegetable slicer and peeler, a supporting member, means for securing the fruit or vegetable to be sliced and peeled on said member, a receiver turnably mounted on said securing member above the fruit or vegetable, means for turning the receiver about the securing member, a slicing knife secured to the receiver adapted to cut a continuous spiral-shaped slice during the rotation of the receiver, and a peeling knife pivotally mounted on the receiver rearwardly of the slicing knife.

4. In a fruit and vegetable slicer and peeler, a supporting member, means for securing the fruit or vegetable to be sliced and peeled on said member, a receiver turnably mounted on said securing member above the fruit or vegetable, means for turning the receiver about the securing member, a slicing knife secured to the receiver adapted to cut a continuous spiral-shaped slice during the rotation of the receiver, an arm yieldingly secured to the receiver and a peeling knife carried by said arm.

5. In a fruit and vegetable slicer and peeler, a supporting member, means for securing the fruit or vegetable to be sliced and peeled on said member, a receiver turnably mounted on said securing member above the fruit or vegetable, means for turning the receiver about the securing member, a slicing knife secured to the receiver adapted to cut a continuous spiral-shaped slice during the rotation of the receiver, an arm pivotally secured to the receiver, a peeling knife pivotally mounted in the free end of the arm, and a spring adapted to hold the arm and the peeling knife carried thereby in engagement with the outer surface of the vegetable or fruit to be peeled at a point rearward of the slicing knife.

6. In a vegetable slicer and peeler, a support, a pronged rod adapted to secure the fruit or vegetable to be sliced and peeled upon the support, a pan-shaped receiver vertically movable and turnable about the rod above the fruit or vegetable, means for turning the receiver about the rod, a slicing knife on the receiver adapted to cut a continuous spiral-shaped slice during the turning of the receiver, and a peeling knife adapted to peel the slice as it leaves the slicing knife.

7. In a vegetable slicer and peeler, a support, a pronged rod adapted to secure the fruit or vegetable to be sliced and peeled upon the support, a pan-shaped receiver vertically movable and turnable about the rod above the fruit or vegetable, means for turning the receiver about the rod, a slicing knife on the receiver adapted to cut a continuous spiral-shaped slice during the turning of the receiver, a spring actuated arm pivotally mounted on the receiver and a peeling knife pivotally mounted in the free end of the arm adapted to peel the slice as it leaves the slicing knife.

8. In a fruit and vegetable slicer and peeler, a support, a pronged rod adapted to secure the fruit or vegetable to be sliced and peeled upon the support, a pan-shaped receiver vertically and radially movable and turnable about the rod above the fruit or vegetable, means for turning the receiver about the rod, a slicing knife on the receiver adapted to cut a continuous spiral-shaped slice during the turning of the receiver and a peeling knife adapted to peel the slice as it leaves the slicing knife.

9. In a fruit and vegetable slicer and peeler, a support, a pronged rod adapted to secure the fruit or vegetable to be sliced and peeled upon the support, a pan-shaped receiver, said receiver having a regularly disposed slot formed in the bottom to permit the receiver to be turned about the rod and to move vertically and radially with relation thereto, a handle on the receiver for turning the same about the rod, a slicing knife on the receiver adapted to cut a continuous spiral-shaped slice during the turning of the receiver, an opening formed in the bottom of the receiver adjacent said slicing knife to permit the slice to enter the receiver and coil itself therein, and a peeling knife adjacent the slicing knife adapted to remove the peeling from the slice as it leaves the slicing knife.

10. In a fruit and a vegetable slicer and peeler, a support, a pronged rod adapted to secure the fruit or vegetable to be sliced and peeled upon the support, a pan-shaped receiver, said receiver having a regularly disposed slot formed in the bottom to permit the receiver to be turned about the rod and to move vertically and radially with relation thereto, a handle on the receiver for turning the same about the rod, a slicing knife on the receiver adapted to cut a continuous spiral-shaped slice during the turning of the receiver, an opening formed in the bottom of the receiver adjacent said slicing knife to permit the slice to enter the receiver and coil itself therein, an arm pivotally mounted on the receiver, a peeling knife pivotally mounted in the free end of the arm adapted to peel the slice as it leaves the slicing knife and a spring engageable with the arm to hold the peeling knife in peeling position.

11. In a fruit and vegetable slicer and peeler, a support, a pronged rod adapted to secure the fruit or vegetable to be sliced and peeled upon the support, a pan-shaped receiver, said receiver having a regularly disposed slot formed in the bottom to permit the receiver to be turned about the rod and to move vertically and radially with relation thereto, a handle on the receiver for turning the same about the rod, a slicing knife on the receiver adapted to cut a continuous spiral-shaped slice during the turning of the receiver, an opening formed in the bottom of the receiver adjacent said slicing knife to permit the slice to enter the receiver and coil itself therein, an arm pivotally mounted on the receiver, a peeling knife pivotally mounted in the free end of the arm adapted to peel the slice as it leaves the slicing knife, a spring engageable with the arm to hold the peeling knife in peeling position, a guide roller carried by the arm adapted to regulate the depth to which the peeling knife cuts and a second guide roller carried by the receiver adapted to hold the slicing knife in position.

12. In a fruit and vegetable slicer and peeler, a support, a pronged rod adapted to secure the fruit or vegetable to be sliced and peeled upon the support, a pan-shaped receiver, said receiver having a regularly disposed slot formed in the bottom to permit the receiver to be turned about the rod and to move vertically and radially with relation thereto, a handle on the receiver for turning the same about the rod, a slicing knife on the receiver adapted to cut a continuous spiral-shaped slice during the turning of the receiver, an opening formed in the bottom of the receiver adjacent said slicing knife to permit the slice to enter the receiver and coil itself therein, an arm pivotally mounted on the receiver, a peeling knife pivotally mounted in the free end of the arm adapted to peel the slice as it leaves the slicing knife, a spring engageable with the arm to hold the peeling knife in peeling position, a guide roller carried by the arm adapted to regulate the depth to which the peeling knife cuts, a second guide roller carried by the receiver adapted to hold the slicing knife in position, and a spring secured at one end to the rod and at the opposite end to the receiver to hold the last-named guide roller in engagement with the exterior surface of the fruit or vegetable to be sliced.

In testimony whereof I have hereunto set my hand in the presence of two subscribing witnesses.

WARREN L. McLEAN.

Witnesses:
 Geo. J. Black,
 C. D. O'Connor.

Copies of this patent may be obtained for five cents each, by addressing the "Commissioner of Patents, Washington, D. C."